March 25, 1969   L. R. ORMEROD   3,434,192
EXTRUSION OF COMPOSITE BODIES

Filed May 5, 1966   Sheet _1_ of 2

United States Patent Office 3,434,192
Patented Mar. 25, 1969

3,434,192
EXTRUSION OF COMPOSITE BODIES
Leslie Roy Ormerod, Didcot, England, assignor to United Kingdom Atomic Energy Authority, London, England
Filed May 5, 1966, Ser. No. 547,923
Claims priority, application Great Britain, May 11, 1965, 19,939/65
Int. Cl. G21c 3/04
U.S. Cl. 29—411                                     7 Claims

ABSTRACT OF THE DISCLOSURE

A method of producing a sheathed nuclear fuel plate comprising the steps of forming a disc from a nuclear fuel material and a sheath material, forming the disc into a sleeve member which includes a region of sheathing material extending lengthwise with respect to said sleeve, interposing the said sleeve between sleeves of sheathing material and co-extruding the assembly. The resulting assembly is tubular and the tube is split lengthwise through the region of sheathing material to form a plate having essentially a core of nuclear fuel material enclosed in a case of sheathing material.

---

This invention relates to the extrusion of composite bodies and is particularly concerned with the production of plate type nuclear reactor fuel elements.

One such form of fuel element comprises a sheet-like core of uranium aluminium alloy sheathed externally with an aluminum cladding.

It has been previously suggested that fuel element plates be produced by a multi-stage rolling process in which a core of nuclear fuel is held in an aluminium frame and sandwiched between two aluminium sheathing sheets the edges of the assembly being welded and subsequently rolled to the desired length and thickness. Such a process can prove difficult and costly and it is an object of the present invention to provide an improved method of forming a sheathed nuclear fuel plate.

According to the invention a method of producing a sheathed nuclear fuel plate comprises the step of forming a disc from components of said materials, forming the disc into a sleeve member, interposing said sleeve between sleeves of sheathing material and co-extruding the assembly.

According to the invention a method of producing a method of producing a sheathed nuclear fuel plate comprises fabricating a composite disc of said fuel and sheathing material, drawing the disc into a cup shape, machining the cup to form a sleeve, interposing the sleeve between inner and outer sleeves of sheath material, extruding the assembly to form a composite tube and splitting said tube lengthwise through the sheathing material to form an arcuate plate.

Preferably the disc is formed by a plurality of sector shaped portions of fuel and sheathing material and the portions joined by electron beam welding.

Figure 1:
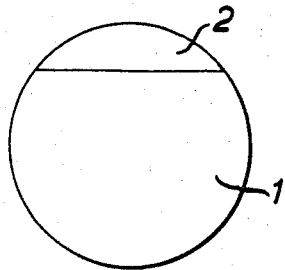
Figure 2:
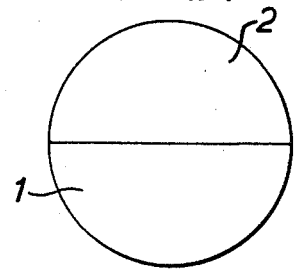
Figure 3:
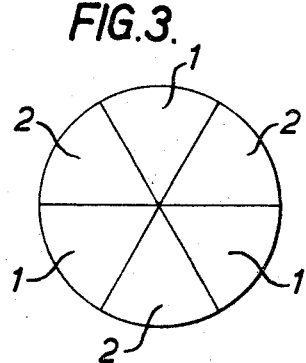
Figure 4:
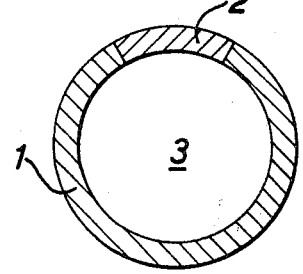
Figure 5:
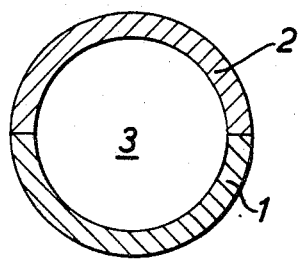
Figure 6:
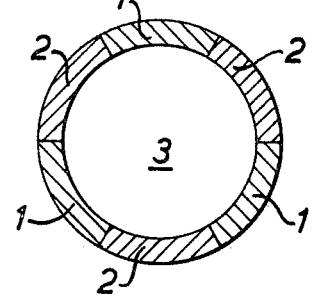
Figure 7:
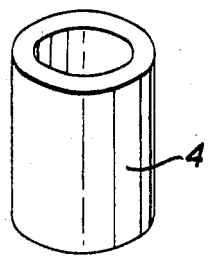
Figure 7:
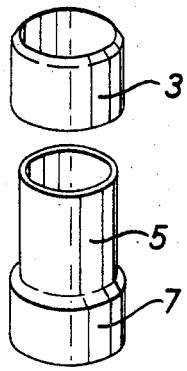
Figure 8:
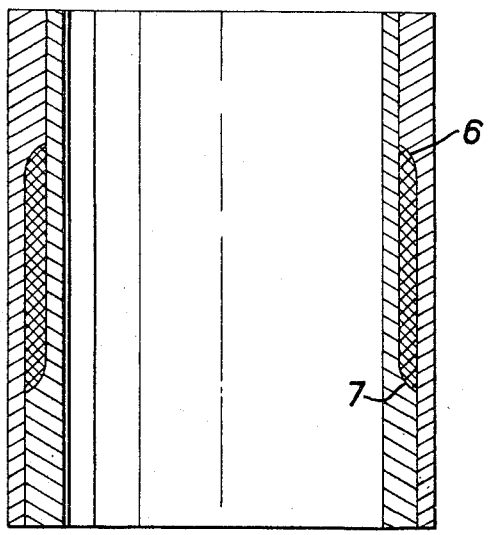

To enable the nature of the invention to be more readily understood embodiments of the invention will now be described by way of example with reference to the accompanying drawing. In the drawing FIGS. 1, 2 and 3 are views of discs formed from nuclear fuel and sheathing material FIGS. 4, 5 and 6 are views of the discs of FIGS. 1, 2 and 3 formed as core sleeves FIG. 7 is a perspective exploded view of a composite slug prepared for extrusion of a fuel tube, and FIG. 8 is a mid-sectional view through an assembly slug.

A conventional form of nuclear fuel element suitable for use in water moderated reactors comprise an assembly of closely spaced fuel plates arranged to form a single fuel element. The plates are generally aluminium sheathed uranium alloy fuel.

Referring to the drawings a method of producing uranium alloy/aluminium sheathed plate type fuel element comprises the formation of a composite disc of uranium alloy and aluminium. The disc is fabricated in such a way as to provide the desired form of finished fuel plate. For example, if a single wide fuel plate is required, the disc may be formed as shown in FIG. 1 with a major portion 1 of uranium alloy and a minor portion 2 of aluminium or as shown in FIG. 2 semicircular portions 1 and 2 may be used to provide equal amounts of uranium alloy and aluminium in the subsequently extruded tube. A further alternative is shown in FIG. 3 in which the disc is formed by alternate sectors of uranium alloy 1 and aluminium 2. This arrangement allows a number of relatively narrow fuel plates to be formed from a single extruded tube.

A suitable size of disc is 4 inches diameter and 1.5 inches thick.

The disc portions are joined by electron beam welding the contiguous edges of the portions and the disc is subsequently formed in a cup shaped member by a back extrusion or drawing process. The cup is machined to form a core sleeve 3 suitable for inclusion in a slug assembly in preparation for coextrusion into a fuel element tube. FIGS. 4, 5 and 6 show core sleeve corresponding to the discs illustrated in FIGS. 1, 2 and 3 respectively.

A slug assembly prepared for the extrusion of a fuel element tube comprises three annular sleeves. An outer aluminium sleeve 4, an inner aluminium sleeve 5 and the composite uranium aluminium alloy core sleeve 3 interposed between the inner and outer sleeve. The inner and outer sleeves are formed with radiused shoulder portions 6 and 7 respectively and when concentrically assembled (FIG. 8) the inner and outer sleeves provide an annular space which accurately locate the core sleeve 3. The ends of the core are radiused to correspond intimately with the shoulders 6 and 7.

To produce a fuel plate suitable for use in a reactor it is essential that a metallurgical bond is established at the interfaces of the aluminium cladding and the uranium-aluminium core during extrusion and the bond should be such that subsequent heating to 600° C.–620° C. does not cause breakdown. One method of obtaining a suitable bond is described in our co-pending patent application Ser. No. 455,854, filed May 14, 1965, but briefly, it has been found that a suitable bond is produced if the inner and outer sleeves are anodized, using the chromic acid process, at least on the portion of their surfaces adjacent the core.

The anodic layer approximately 0.0095 inch thick is relatively brittle and tends to shatter as soon as extrusion deformation begins but provides, for a short period, substantially oxide free interfaces which bond together easily. The particles of oxide from the anodic layer penetrate into the interfaces and improve the metal flow characteristics during the extrusion.

While forms of anodising other than the chromic acid process can be used to provide the bond assisting layer in the aluminium components it has been found that the chromic acid process produces the more satisfactory results particularly when the fuel elements are required to withstand high temperatures (620° C.).

Using the conventional chromic acid process for 99.5% aluminium the inner and outer sleeves 1 and 2 are anodised before assembly around the areas of the radiused shoulder 6 and 7.

After assembly the slug is swaged, preferably in a direction opposed to the direction of extrusion, to remove any radial clearance between the components and the whole assembly is then de-hydrated at 625° C. for two hours in preparation for the extrusion process.

The de-hydration may be carried out in vacuum or in an air circulating oven in which case the slug is protected by an aluminium foil wrapper.

To reduce the difficulties attendant in anodising only part of the surface of the sleeve, all of the inner surface of the outer sleeve 4 and all of the outer surface of the inner sleeve 5 can be anodised if desired. Alternatively the fuel containing core sleeve 3 can be anodised but the uranium 235 content of the alloy tends to complicate the process and in practice it has proved simpler to anodise the other components.

To form a fuel tube the slug assembly is extruded after the dehydration stage to a tube length of approximately 24 inches. The tube is split lengthwise through the aluminium segments to provide one, two or more arcuate plates according to the form of disc initially fabricated.

The fuel insert is completely enclosed by sheath material and the plates can be rolled flat or given other degrees of curvature as desired. It will be appreciated that using the method of the invention one set of extrusion tools can produce fuel plates with a variety of core widths and/or total plate widths thus achieving economies in production costs.

It will also be appreciated that the use of the term aluminium is used as including aluminium alloys and in particular the aluminium alloys used as cladding materials for nuclear reactor fuel elements.

I claim:
1. A method of producing a sheathed nuclear fuel plate comprising the steps of forming a composite disc from a nuclear fuel material and a sheathing material, forming the disc into a sleeve member which includes a region of sheathing material extending lengthwise with respect to the sleeve, interposing said sleeve between sleeves of sheathing material and co-extruding the assembly to form a composite tube and splitting said tube lengthwise through the region of sheathing material to form an arcuate plate having a core of nuclear fuel material completely encapsulated by sheathing material.

2. A method of producing a sheathed nuclear fuel plate comprising fabricating a composite disc of nuclear fuel and sheathing material, drawing the disc into a cup shape, machining the cup to form a sleeve, interposing the sleeve between inner and outer sleeves of sheath material, extruding the assembly to form a composite tube and splitting said tube lengthwise through the sheathing material to form an arcuate plate.

3. A method of producing a sheathed fuel plate according to claim 2 wherein the disc is formed by a plurality of sector shaped portions of fuel and sheathing material and the portions joined by electron beam welding.

4. A method of producing a sheathed fuel plate according to claim 3 wherein the discs are formed by alternate sectors of uranium alloy and aluminium.

5. A method of producing a sheathed nuclear fuel plate comprising fabricating a composite disc of nuclear fuel and sheathing material, drawing the disc into a cup shape, machining the cup to form a sleeve, interposing the sleeve between inner and outer sleeves of sheath material, to form an extrusion slug, at least a portion of the surfaces of the inner and outer sleeves adjacent the fuel portions in said composite slug being anodised by the chromic acid process, swaging the slug to remove any radial clearance between the components, dehydrating and subsequently extruding the slug to form a tubular element and finally splitting the element lengthwise through the sheathing material to circumferentially separate the portions of nuclear fuel.

6. A method of producing a sheathed nuclear fuel plate according to claim 5 comprising the steps of swaging the slug in counter direction to the direction of extrusion to remove any radial clearance between the components, heating the assembly to 625° C. for at least two hours, subsequently extruding the assembly to form a tubular element and splitting the element lengthwise through the portions circumferentially separating the fuel portions to form arcuate plates.

7. A method of producing a sheathed fuel plate according to claim 1 wherein the disc is formed from a segment of sheathing material and a segment of nuclear fuel material.

References Cited

UNITED STATES PATENTS

| | | | |
|---|---|---|---|
| 1,537,068 | 5/1925 | Croselmire | 29—160.6 |
| 2,023,498 | 12/1935 | Winston | 29—497.5 X |
| 2,975,113 | 3/1961 | Gordon | 29—422 |
| 2,983,660 | 5/1961 | Loeb et al. | 29—422 X |

THOMAS H. EAGER, *Primary Examiner.*

U.S. Cl. X.R.

29—414, 422, 471.1, 497.5; 176—90